Dec. 19, 1961
C. A. RICHIE ET AL  3,013,306
METHOD OF MAKING CELLULAR PLASTIC ARTICLES
Filed Nov. 7, 1960
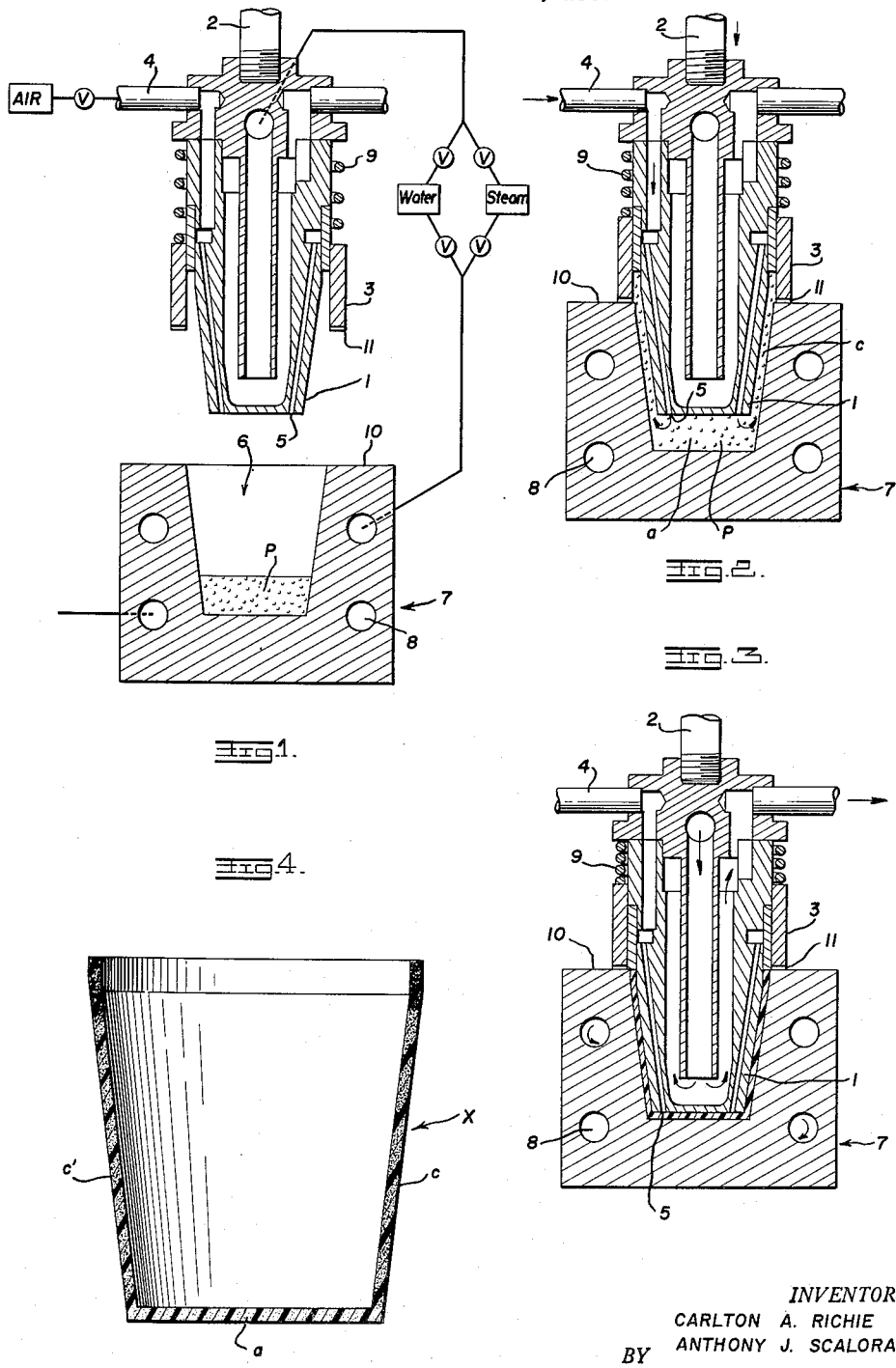
INVENTORS
CARLTON A. RICHIE
ANTHONY J. SCALORA
BY
W. A. Schaich and Charles S. Lynch
ATTORNEYS United States Patent Office 3,013,306
Patented Dec. 19, 1961

3,013,306
METHOD OF MAKING CELLULAR PLASTIC ARTICLES
Carlton A. Richie and Anthony J. Scalora, Toledo, Ohio, assignors to Owens-Illinois Glass Company, a corporation of Ohio
Filed Nov. 7, 1960, Ser. No. 67,856
11 Claims. (Cl. 18—48)

This invention relates to a method of molding cellular plastic articles by using a gas to effect a distribution of the cellular plastic materials from which the articles are made.

In one aspect this invention relates to a method of making cellular plastic articles characterized by having walls of different densities by using a flow of gas to effect a differential distribution of the cellular plastic materials from which the articles are made.

In the manufacture of cellular plastic articles from expendable cellular plastic beads the problem has arisen as to just how these plastic beads might be effectively distributed in the mold cavity during the molding of articles from such beads. For the molding of some articles, it would be desirable to distribute the beads in a substantially uniform manner throughout the mold cavity. On the other hand in the manufacture of certain containers it is often desirable to distribute the beads differentially within the mold cavity so as to form said containers with walls which have variable densities in order that the containers will be stronger in areas which have to withstand the greatest stress and strain and less strong in areas which are subject to less stress and strain or by their geometry are better reinforced to withstand stress and strain. This has the further advantage in that it results in a more efficient utilization of a given amount of molding material used to make the container.

Also, such differential density of the container walls is contrary to the customary molding practices which is to form any molded article with walls of uniform density so as to avoid so-called thin areas.

It is, therefore, an important object of the invention to provide a method for distributing particulate expandable plastic material throughout the mold cavity before final expansion and molding of the plastic.

It is, therefore, an object of this invention to provide a method of making cellular plastic articles, and particularly containers, whose walls are stronger in certain desired areas than in other areas.

Another object of this invention is to provide a method of making cellular plastic containers whose walls are of variable density.

Another object of this invention is to provide a method for fabricating the walls of containers whose walls will be adapted to withstand variable stresses and strains.

An additional object is to provide a method for shaping containers from cellular plastic materials such as polystyrene.

A further object of this invention is to provide a method for shaping plastic containers in which the walls are more dense in those areas of greater stress and shock and less dense in those areas which are subject to lesser stress and shock.

A still further object is to provide a method for producing cellular plastic articles in which the plastic materials which make up the articles are more efficiently utilized to provide articles of maximum strength under varying conditions of stress, strain, and shock.

In general the present invention relates to a new method of producing cellular plastic articles from cellular plastic material by distributing said material by a flowing gaseous medium. A more specific form of this invention contemplates the manufacture of cellular plastic articles whose side walls are made of a cellular plastic material which is differentially distributed so as to provide areas which are more dense than other areas from which it follows that the more dense areas will be stronger than the less dense areas. Moreover, the present invention relates to a method of making the aforementioned articles in which a flow of gas through the mold cavity is used to effect the distribution of the cellular plastic materials or partially expanded plastic beads in a mold cavity during the portion of the molding cycle during which the mold is closing, and after the mold is closed and the flow of gas discontinued, heating the male and/or female mold member to effect a further expansion of the beads so as to fill the interstices between the beads and cause the mold charge to conform to the shape of the mold. The male mold member can then be retracted and the formed article removed from the mold cavity.

Further objects and advantages of the present invention will be apparent from the following specification and claims which include preferred embodiments of the present invention, and from the drawings, hereby made a part of the specification, wherein:

FIGURE 1 is a schematic cross section view showing the mold elements in the open position;

FIGURE 2 is a schematic cross sectional view showing the mold elements in a partially closed position;

FIGURE 3 is a schematic cross sectional view showing the mold elements in a fully closed position, and FIGURE 4 is a sectional view of a container made in accordance with the method of this invention.

Referring to the drawings, the plastic container X is illustrative of articles made by the preferred method of this invention. Container X shown in FIGURE 4 consists of a bottom wall $a$ and side walls $c$ and $c'$ of uniform thickness. It will be noted that not only are the side walls $c$ and $c'$ more dense than bottom wall $a$, but that the upper areas of side walls $c$ and $c'$ are more dense than the lower areas. Thus, the finish or lip of the container is more dense than the remainder of the container. This is desirable where container X is used as a drinking cup since the greatest density and therefore the greatest strength is located where the cup is subjected to the greatest strain, that is, lateral compression forces resulting from gripping of the cup by the user thereof. It will also be evident that a container such as that described above will for a given amount of plastic material provide the most efficient utilization of the plastic. Moreover, it will be noted that if the container walls were of uniform density, the strength thereof would be the same throughout such that certain areas of the container walls which are subject to lesser amounts of shock would be stronger than necessary while areas which need to withstand greater stresses would be of no greater density or strength and accordingly would be more prone to breakage in those areas.

The relationship of density of plastic to strength is well illustrated by the following table:

TABLE I

Correlation of strength with density

| Density of Cellular Polystyrene Coating, lb. per cu. ft. | Compressive Strength, p.s.i. | Unnotched Impact Strength (Izod Test), in. lbs. per in. |
|---|---|---|
| 2 | 18 | 2 |
| 4 | 36 | 2.8 |
| 6 | 55 | 3.5 |

It will be apparent from the table above that if container X of FIGURE 4 has a 2 lb. per cu. ft. density in bottom wall $a$, a 4 lb. per cu. ft. density in the lower portions of side walls c and c', and 6 lb. per cu. ft. density in the upper portions of side walls c and c', the surface of the container will exhibit marked variations in strength.

Although the density of the plastic article can vary from 2 to 6 lbs. per cu. ft., higher and lower ranges of densities may be employed depending upon the weight of plastic charge originally placed into the mold cavity and the degree of strength desired of the container being formed. Accordingly densities ranging from 1 lb. per cu. ft. to 10 lbs. per cu. ft. may be employed.

A preferred method for making the article of FIGURE 4 and suitable apparatus for accomplishing the same is set forth below. More specifically and with reference to FIGURES 1, 2 and 3 there is shown a molding apparatus in open position having a male die member or force plug 1 which is integral with a plunger 2 which has conventional means, not shown, for reciprocating the same. The force plug 1 which is drilled for circulating steam and water, is mounted inside of a spring loaded sleeve 3. Instead of a drilled force plug a porous metal plug can be employed, if desired. An air inlet 4 connected to a suitable source of air under pressure runs down through the force plug 1 terminating in an opening 5 in the bottom of said plug 1. The lower mold 7 is provided with steam heating coils 8 through which water can also be circulated for cooling purposes.

In operation a plastic bead charge P, such as partially expanded polystyrene, is placed in the mold cavity 6. One method of effecting this introduction of the bead charge into the mold cavity would be by the well known injection means, not shown, as taught by either U.S. Patent 2,155,316 or U.S. Patent 2,235,222, or by hand or any other suitable means. Pressure is applied to the plunger 2 which results in the downward movement of force plug 1 whereby sleeve 3 mounted on springs 9 contacts the upper surface 10 of mold 7 as shown by FIGURE 2. When the sleeve 3 contacts the upper surface 10, air from the compressed air source is caused to enter inlet 4 and flow upwardly and continuously during the downward movement of the force plug through the mold cavity and out through grooves 11 which are on the lower surface of sleeve 3. FIGURE 2 is a view shortly after sleeve 3 has contacted surface 10 and shows the springs 9 beginning to be compressed. In this particular embodiment the flow of air is maintained at a high enough rate to distribute the beads throughout the mold cavity and to cause the beads in the upper portion of the mold cavity to be more closely compacted than in the lower portion. The force plug 1 then continues to its downmost position while air continuously flows through the mold cavity, as shown by FIGURE 3, at which time air flow is discontinued and steam is caused to enter the heating coils 8 causing the beads to expand and coalesce to form the finished article X. The heating with steam is continued for a time sufficient to give the beads the requisite expansion and to cause them to adhere into a coherent mass. Thereafter a coolant is passed through these coils to discontinue expansion of the beads and set up the article. The force plug 1 is then withdrawn from the mold cavity 6 and the article X removed. The resulting article X as shown in FIGURE 4 will be found unitary in structure and have a greater strength in its two vertical side members, c and c' than in its bottom member a. This is particularly desirable in the case of drinking cups made by this process which are subject to lateral compressive forces.

Although the foregoing represents a preferred method particularly as it relates to the manufacture of cellular plastic articles having areas of differing densities, this invention also contemplates the more general process, namely, the distribution of plastic materials and especially plastic beads by continuously flowing a gas through a mold cavity during the molding operation so as to distribute the beads either in a uniform or differential manner throughout the mold cavity, as desired. Where a substantially uniform distribution of the plastic beads occurs, the article formed will, of course, have a substantially uniform density in contrast to the article of FIGURE 4.

A particularly suitable polystyrene plastic is that designated as "Dylite" which is in the form of beads and made by the Koppers Chemical Company. These beads can be given a pre-expansion treatment which consists of heating the original or virgin beads at 180°–240° F. until a density of 1–5 lbs. per cu. ft. is obtained. These polystyrene beads contain a volatile liquid, n-pentane, as an expanding agent. However, particulate polystyrene containing any volatile liquid expanding agent can be employed. Moreover, particulate polystyrene containing one of the solid chemical expansion agents which decompose on heating to yield a gaseous expansion agent can also be used. Although polystyrene is preferred, any plastic can be used which is capable of being formed and further expanded upon the application of additional heat in the manner described above.

The temperatures required to expand and fuse the cellular or pre-expanded polystyrene beads in the mold ranges from 180° to 240° F. After completion of the molding cycle which takes on in the order of 5–15 seconds, the force plug and mold cavity are cooled to at least 150° F. at which temperature the formed article can be stripped readily from the force plug.

The air pressures usually employed are from 3–10 lbs. p.s.i. with a pressure of 3–5 lbs. p.s.i. being the preferred range.

In the method of practicing the invention here disclosed it is important that the compressed air inlet be positioned where minimum density of plastic particles is desired since it has been observed that the distribution of the particles is densest in the extremities of the mold cavity (upper regions of areas c and c' of FIGURE 2) or those areas most distant from the compressed air inlet. Since the mold cavity is only partially filled with the plastic initially, as shown in FIGURE 1, the upper portions of c and c', which in the finished article are subject to the most stress due to lateral strain, are positioned farthest from the inlet 4. When the air under pressure which is moving at a relatively high rate of flow is introduced through the inlet 4, most of the beads are distributed to the upper portions of c and c' and the density of the beads is greater here than in area a and the lower portions of areas c and c'. Accordingly the strength of the upper portions of areas c and c' in the finished article is greater than in area a and the lower portions of areas c and c'. However, one can use a low pressure or a relatively low rate of flow of air whereby fewer particles are blown out of the bottom of the mold into the side areas with most of the particles remaining in the bottom of the mold. The particles in the side area may be described as being held in an incipient fluidized state until the mold reaches its lowermost position as shown in FIGURE 3. It will be apparent that the article resulting from such molding conditions will be more dense, and therefore stronger, in the bottom areas, and less dense and accordingly less strong but yet adequate in the side areas for certain purposes. For example, such an article would be desirable where the bottom thereof is subject to greater mechanical shock than the sides as in the case where the article was likely to be roughly handled by being frequently dropped or caused to fall on its lower or bottom side. Under such circumstances the article may not be subject to serious lateral forces to its sides and accordingly less dense sides would be suitable. From the foregoing explanation it will be evident that the position of the air inlets and the velocity of the incoming compressed air will determine the manner in which the plastic beads will be differentially distributed throughout the mold cavity 6.

It is understood that the invention as described above is a preferred embodiment and that certain variations can be made without affecting the basic operation of the apparatus disclosed. For example, the mold cavity can have other shapes than that shown. Moreover, the steam coil heating means can be replaced by electrical heating means such as induction and resistance heating if deemed desirable. Other conventional heating means can be employed including direct steam injection wherein, for example, the inside walls of lower mold member 7 or force plug 1 or both are perforated and connected to a source of steam. In addition to facilitate removal of the finished article, the force plug and/or the lower mold cavity can be coated with any of the well known mold lubricants such as the silicones. It is also apparent to one skilled in the art that the improvement in molding methods disclosed by this invention is readily adaptable to molding machines employing a plurality of force plugs and mold cavities as typified by U.S. Patents 2,115,316, 2,183,869 and 2,235,222. Moreover, the air opening 5 is shown as being located in the force plug but it is within the purview of this invention that an air opening can be located in the lower mold cavity, immediately opposite and below opening 5. However, any such opening for the incoming air or gas under pressure should be so placed on either the force plug 1 or lower mold 7 so as to effect preferably an upward flow of the gas throughout the entire cavity formed by plug 1 and mold 7 during closing of the mold (FIG. 2). Of course, it will be evident that in the closing of the mold (FIG. 2) to its final position (FIG. 3), plug 1 and mold 7 will also assist in distributing the plastic bead particles P. Thus, it will be noted that the cross-sectional area of the annular space between the force plug 1 and cavity 6 is larger in FIG. 2 than in the final molding position of FIG. 3. Therefore it is easier to blow the plastic into this larger space; more importantly, the plastic is slightly compressed as force plug 1 moves downwardly and is thereby held in place by bridging so that the beads stay in place even after the gas flow is discontinued as in FIGURE 3, which shows the mold in the final and completely closed position. In addition any heat expansible particulate plastic can be employed in the process. It will also be evident that a gas under pressure other than air can be used to effect distribution of the plastic particles. Preferably the gas should be unreactive with the plastic beads and accordingly gases such as nitrogen, argon, carbon dioxide, steam and the like can be effectively employed. Furthermore, both the force plug and mold cavity can be provided with heating means. Other appropriate changes can be made within the skill of one familiar with the art.

From the foregoing description it will be apparent that we have devised a novel plastic molding method in which compressed air is not used to shape directly plastic sheet material into the desired article, such as a plastic cup, as is well known in the art but to effect a differential distribution of the molding materials prior to form shaping by the mold members. This technique is particularly significant with respect to molding partially expanded thermoplastic beads, such as polystyrene, which are found to be admirably adapted for manufacturing lightweight low heat transfer plastic containers in accordance with the method disclosed by this invention because of their excellent insulating properties and their remarkable storage life at very low temperatures.

Representative embodiments of the invention have been described above, but it is to be understood that these are for illustrative purposes only, and that the invention herein disclosed may take various other forms coming within the scope of the appended claims.

This application is a continuation-in-part of Serial No. 841,342, filed September 21, 1959, and now abandoned.

What we claim is:

1. In a method of molding an article having bottom and side walls from foamable plastic beads which comprises loading plastic beads into the bottom half of a mold, downwardly advancing the upper half of the mold into contact with the bottom half to close the mold, said upper half having a male plug portion extending into the bottom half so as to define an annular space between the side walls of the bottom half and the side walls of the upper half, the improvement which comprises further downwardly advancing said male plug portion into said bottom half until the final molding position is reached, and during said further advancing continuously flowing a gas upwardly through said annular space, thereby suspending a portion of said beads in the gas and thus distributing the beads into said side walls, the volume of said annular space decreasing during said further downward advance of said male plug, and thereafter heating said foamable beads to foam and fuse them to form said article.

2. In a method of molding an article having bottom and side walls from foamable plastic beads which comprises loading plastic beads into the bottom half of a mold, downwardly advancing the upper half of the mold into contact with the bottom half to close the mold, said upper half having a male plug portion extending into the bottom half so as to define an annular space between the side walls of the bottom half and the side walls of the upper half, the improvement which comprises further downwardly advancing said male plug portion into said bottom half until the final molding position is reached, and during said further advancing continuously flowing a gas upwardly through said annular space, thereby suspending said beads in the gas and differentially distributing the beads within said annular space, the volume of said annular space decreasing during said further downward advance of said male plug, and thereafter heating said foamable beads to foam and fuse them to form said article.

3. The method of claim 2 wherein the differential distribution occurs as to position more beads in the side walls and thereby make the side walls more dense than the bottom walls.

4. The method of claim 2 wherein the differential distribution occurs as to position more beads in the bottom walls and thereby make the bottom walls more dense than the side walls.

5. In a method of molding an article having bottom walls and side walls with a lip from foamable plastic beads which comprises loading plastic beads into the bottom half of a mold, downwardly advancing the upper half of the mold into contact with the bottom half to close the mold, said upper half having a male plug portion extending into the bottom half so as to define an annular space between the side walls of the bottom half and the side walls of the upper half, the improvement which comprises further downwardly advancing said male plug portion into said bottom half until the final molding position is reached, and during said further advancing continuously flowing a gas upwardly through said annular space, thereby suspending a portion of said beads in the gas and thus differentially distributing the beads into said annular space so as to position more beads in the lip and thereby make the lip more dense than the bottom walls and the remainder of the said walls.

6. In a method of molding articles having walls of varying density from a charge of heat expansible thermoplastic bead material, the steps comprising partially filling a mold cavity with said charge, completely enclosing said mold cavity by means of a male mold member and a female mold member of a mold, effecting a differential distribution of the charge in said enclosed mold cavity, and compressing by means of said mold members the charge into a shaped article while simultaneously supplying heat to the charge for the purpose of expanding the charge and of facilitating the shaping of the article during the molding process.

7. In a method of molding articles having walls of varying density from a charge of heat expansible thermoplastic bead material, the steps comprising partially filling a mold cavity with said charge, completely enclosing said mold cavity by means of a male mold member and a female mold member of a mold, effecting a differential distribution of the charge in said enclosed mold cavity by flowing a gas therethrough, and compressing the charge into a molded shaped article while simultaneously supplying heat to the charge for the purpose of expanding the charge and of facilitating the shaping of the article during the molding process.

8. The method of claim 5 in which the gas is air.
9. The method of claim 5 in which the gas is carbon dioxide.
10. The method of claim 5 in which the gas is nitrogen.
11. The method of claim 5 in which the gas is steam.

References Cited in the file of this patent
UNITED STATES PATENTS

| | | |
|---|---|---|
| 2,386,604 | Goetzel | Oct. 9, 1945 |
| 2,951,260 | Harrison et al. | Sept. 6, 1960 |

FOREIGN PATENTS

| | | |
|---|---|---|
| 256,609 | Switzerland | Mar. 16, 1949 |